(12) United States Patent
Mizoguchi et al.

(10) Patent No.: US 7,633,371 B2
(45) Date of Patent: Dec. 15, 2009

(54) THERMISTOR ELEMENT, THERMISTOR ELEMENT PRODUCTION METHOD AND THERMISTOR TEMPERATURE SENSOR

(75) Inventors: Yoshihito Mizoguchi, Nagoya (JP); Yasuyuki Okimura, Nagoya (JP); Takeshi Mitsuoka, Nagoya (JP); Kazushige Ohbayashi, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 176 days.

(21) Appl. No.: 11/657,628

(22) Filed: Jan. 25, 2007

(65) Prior Publication Data

US 2007/0188295 A1 Aug. 16, 2007

(30) Foreign Application Priority Data

Feb. 16, 2006 (JP) .............................. 2006-039680

(51) Int. Cl.
    *H01C 7/10* (2006.01)
(52) U.S. Cl. ................ 338/22 R; 252/518.1; 252/520.5
(58) Field of Classification Search ............... 338/22 R; 252/518.1, 521.1, 521.2, 519.51, 520.5
    See application file for complete search history.

(56) References Cited

U.S. PATENT DOCUMENTS

| | | | |
|---|---|---|---|
| 6,261,480 B1 | 7/2001 | Ogata et al. | |
| 6,306,315 B1 | 10/2001 | Ogata et al. | |
| 6,740,261 B1 | 5/2004 | Ogata et al. | |
| 2002/0020949 A1 | 2/2002 | Kuzuoka et al. | |
| 2003/0205698 A1 | 11/2003 | Ogata et al. | |

FOREIGN PATENT DOCUMENTS

| | | |
|---|---|---|
| EP | 1 564 197 A1 | 8/2004 |
| JP | 8-261846 A | 10/1996 |
| JP | 10-318850 A | 12/1998 |
| JP | 11-251109 A | 9/1999 |
| JP | 2001-143907 A | 5/2001 |
| JP | 3362651 B2 | 10/2002 |
| JP | 3362659 B2 | 10/2002 |
| JP | 2003-183075 A | 7/2003 |
| JP | 2004-221519 A | 8/2004 |

*Primary Examiner*—Kyung Lee
(74) *Attorney, Agent, or Firm*—Sughrue Mion, PLLC

(57) ABSTRACT

A thermistor element includes a thermistor body and a reduction-resistant coating covering the thermistor body. The thermistor body contains a perovskite phase of perovskite-type crystal structure represented by the composition formula: $ABO_3$ where A is at least one A-site element and B is at least one B-site element. The reduction-resistant coating is formed of a complex oxide containing one or more of the at least one A-site element and one or more of the at least one B-site element.

13 Claims, 3 Drawing Sheets

THERMISTOR ELEMENT, THERMISTOR ELEMENT PRODUCTION METHOD AND THERMISTOR TEMPERATURE SENSOR

BACKGROUND OF THE INVENTION

The present invention relates to a thermistor element, a thermistor element production method and a thermistor temperature sensor.

A thermistor element is generally produced from a sintered conductive oxide that shows a change in resistance (specific resistance) with a change of temperature and is suitably used in a temperature sensor. Japanese Laid-Open Patent Publication No. 11-251109 discloses one type of thermistor element having a thermistor body formed of a sintered conductive oxide with a perovskite phase of e.g. $Y(Cr, Mn)O_3$ or $Y(Cr, Mn)O_3$ and a metal oxide phase of e.g. $Y_2O_3$ or $Al_2O_3$.

In the case of using the thermistor element or thermistor temperature sensor in an internal combustion engine to measure the temperature of engine exhaust gas, there has recently been a demand for the thermistor element to enable temperature measurements in a high temperature range of around 900° C. for the protection of a diesel particulate filter (DPF) and a $NO_x$ reduction catalyst in the engine. There has also been a demand for the thermistor element to enable temperature measurements in a low temperature range for the application of on-board diagnostics (OBD). The thermistor element may thus be required to carry out temperature measurements over the wide range from a low temperature of −40° C. to a high temperature of 900° C. or higher. In order to protect the thermistor element from condensation and soot in the measurement gas during the temperature measurements over such a wide temperature range, a metal tube of e.g. stainless alloy is provided to accommodate therein the thermistor element.

SUMMARY OF THE INVENTION

However, the metal tube is oxidized to create a reducing atmosphere in the interior of the metal tube when the temperature of the metal tube exceeds 600° C. or higher. The thermistor element is then reduced in the reducing atmosphere so that the resistance (characteristics) of the thermistor element becomes changed.

It is conceivable to heat-treat the metal tube previously so as to form a coating of metal or metal oxide on an inner surface of the metal tube and protect the metal tube from thermal oxidation under high temperature conditions. However, the metal or metal oxide coating may be broken due to vibrations during the use of the thermistor element (temperature sensor) or may have a defect in itself. When the metal tube is oxidized through such a break or defect of the coating, the thermistor element is reduced to cause a change in thermistor resistance (characteristics).

On the other hand, Japanese Laid-Open Patent Publication No. 11-251109 teaches forming a reduction-resistant coating of e.g. $Y_2O_3$, $Al_2O_3$, $SiO_2$, $Y_3Al_5O_{12}$ or $3Al_2O_3 \cdot SiO_2$ on the thermistor body in order to protect the thermistor body from thermal reduction. In Japanese Laid-Open Patent Publication No. 11-251109, however, the reduction-resistant coating is formed without consideration of the correlation between the metal elements of the perovskite phase and the metal element of the reduction-resistant coating. As a result, the compositions of the perovskite phase and of the reduction-resistant coating vary due to metal migration between the perovskite phase and the reduction-resistant coating when the thermistor element is subjected to high temperatures for a long time. This causes a change in thermistor resistance (characteristics).

It is therefore an object of the present invention to provide a thermistor element for enabling proper temperature measurements over the wide range from a low temperature to a high temperature of over 600° C. while limiting the occurrence of a secular change in thermistor resistance (characteristics) even if placed under high temperature conditions in a reducing atmosphere. It is also an object of the present invention to provide a production method of the thermistor element and a temperature sensor using the thermistor element.

According to a first aspect of the present invention, there is provided a thermistor element, comprising: a thermistor body containing a perovskite phase of perovskite-type crystal structure represented by the composition formula: $ABO_3$ where A is at least one A-site element and B is at least one B-site element; and a reduction-resistant coating covering the thermistor body and formed of a complex oxide containing one or more of the at least one A-site element and one or more of the at least one B-site element.

According to a second aspect of the present invention, there is provided a method for producing a thermistor element, the thermistor element having a thermistor body containing a perovskite phase of perovskite-type crystal structure represented by the composition formula: $ABO_3$ where A is at least one A-site element and B is at least one B-site element and a reduction-resistant coating covering the thermistor body and formed of a complex oxide containing one or more of the at least one A-site element and one or more of the at least one B-site element, the method comprising: forming a green thermistor composition material into a desired shape; applying a green coating material to a surface of the green thermistor composition material; and then sintering the thermistor composition material and the coating material simultaneously in such a manner that the thermistor body and the reduction-resistant coating are produced from the sintered thermistor composition material and the sintered coating material, respectively.

According to a third aspect of the present invention, there is provide a temperature sensor comprising: a thermistor element having a thermistor body containing a perovskite phase of perovskite-type crystal structure represented by the composition formula: $ABO_3$ where A is at least one A-site element and B is at least one B-site element; and a reduction-resistant coating covering the thermistor body and formed of a complex oxide containing one or more of the at least one A-site element and one or more of the at least one B-site element.

The other objects and features of the present invention will also become understood from the following description.

DESCRIPTION OF THE EMBODIMENTS

The present invention will be described below in detail with reference to the drawings.

Figure 1A:
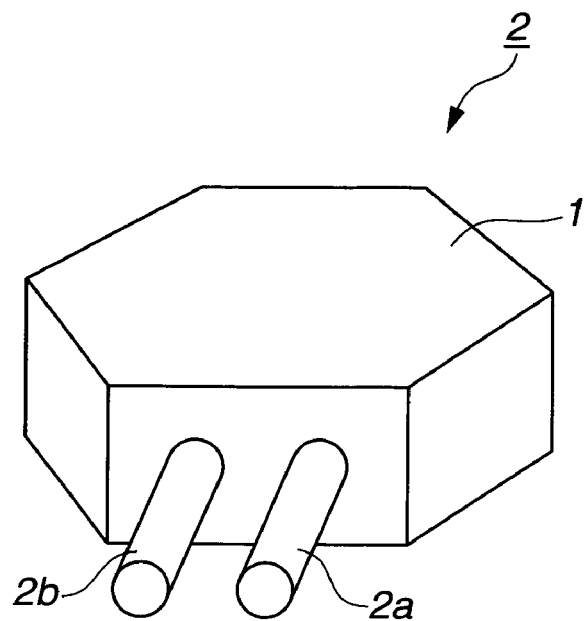
FIG. 1A is a perspective view of a thermistor element according to one embodiment of the present invention.
Figure 1B:
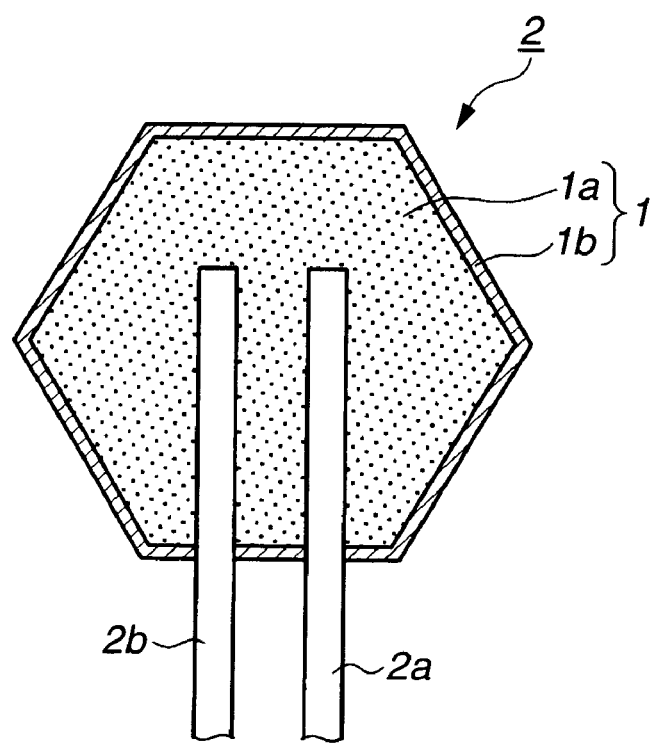
FIG. 1B is a sectional view of the thermistor element according to one embodiment of the present invention.

As shown in FIGS. 1A and 1B, there is provided according to one embodiment of the present invention a thermistor element 2 that includes a body part 1 having a thermistor body 1a and a reduction-resistant coating 1b and a pair of electrode wires 2a and 2b embedded at respective one ends thereof in the thermistor body part 1. In the present embodiment, the thermistor body part 1 is formed into a hexagonal plate shape.

The thermistor body 1a has electrical conductivity and contains a perovskite phase formed with a perovskite-type crystal structure as represented by the composition formula: $ABO_3$. Each of the A-site and the B-site of the perovskite phase is occupied by one or more metal elements. Specific examples of the A-site element(s) are metal elements of group 2A and metal elements of group 3A other than La. Specific examples of B-site element(s) are Al and metal elements of groups 4A, 5A, 6A, 7A and 8. In order for the thermistor body 1a to achieve appropriate electrical conductivity and enable temperature measurements over the wide range from a low temperature to a high temperature of over 600° C., it is preferable that the perovskite phase has a composition of $(M1, M2)(M3, Cr, Al)O_3$ where M1 is at least one of the metal elements of group 3A other than La; M2 is at least one of the metal elements of group 2A; and M3 is at least one of the metal elements of groups 4A, 5A, 6A, 7A and 8 other than Cr. More preferably, the perovskite phase has a composition of $(Y, Sr)(Mn, Cr, Al)O_3$ in order for the thermistor body 1a to show a suitable temperature gradient constant (B-value B(−40~900)) of 2000 to 3000 K in the range of −40 to 900° C. for proper temperature measurements. The B-value B(−40~900) of the thermistor body 1a is desirably 2000 to 2900 K, more desirably 2000 to 2800 K.

It is noted that: the elements of groups 2A, 3A, 4A, 5A, 6A and 7A in the present embodiment correspond to those of groups 2, 3, 4, 5, 6 and 7 in the IUPAC system, respectively; and the elements of group 8 in the present embodiment corresponds to those of group 8, 9 and 10 in the IUPAC system.

There is a possibility of excess or lack of oxygen in the perovskite phase depending on the sintering conditions (such as a sintering atmosphere e.g. oxidation/reduction atmosphere and a sintering temperature) of the thermistor material for production of the thermistor element 2 and the degree of substitution of the constituent elements of the A-site and the B-site of the perovskite phase. The molar ratio between the oxygen atom and the A-site element(s) and the molar ratio between the oxygen atom and the B-site element(s) may not be thus truly 3:1 as long as the perovskite phase maintains its perovskite-type crystal structure.

The reduction-resistant coating 1b is applied to the thermistor body 1a in such a manner as to cover the thermistor body 1a densely by the reduction-resistant coating 1b. By the application of the reduction-resistant coating 1b to the thermistor body 1a, it is possible to protect the thermistor body 1a from reduction and thereby prevent the resistance (characteristics) of the thermistor body 1a from changing when the thermistor element 2 is placed in a reducing atmosphere under high temperature conditions.

Further, the reduction-resistant coating 1b is formed of a complex oxide containing at least one A-site element and at least one B-site element of the perovskite phase of the thermistor body 1a. Examples of such a complex oxide are Y—Al oxides (e.g. $YAlO_3$, $Y_3Al_5O_{12}$) and Sr—Al oxides (e.g. $SrAl_2O_4$). A plurality of complex oxide compounds may be used in combination. It is unlikely that only one of the metal elements of the perovskite phase will migrate alone to the reduction-resistant coating 1b (the complex oxide) even if the thermistor element 2 is subjected to high temperatures for a long time. When the metal element of the perovskite phase is of the same kind as the metal element of the complex oxide, this metal element is particularly unlikely to migrate to the reduction-resistant coating 1b due to its small concentration gradient. It is also unlikely that either one of the metal elements of the reduction-resistant coating 1b (the complex oxide) will migrate alone to the perovskite phase even if the thermistor element 2 is subjected to high temperatures for a long time. When the metal element of the reduction-resistant coating 1b is of the same kind as the metal element of the perovskite phase, this metal element is particularly unlikely to migrate to the perovskite phase due to its small concentration gradient. It is thus possible to limit variations in the compositions of the thermistor body 1a and the reduction-resistant coating 1b due to metal migration between the perovskite phase and the reduction-resistant coating 1b (the complex oxide) and prevent the resistance values and characteristics of the thermistor body 1a and the reduction-resistant coating 1b from changing when the thermistor element 2 is placed under high temperature conditions for a long time.

The thermistor element 2 is therefore able to achieve stable resistance characteristics for proper temperature measurements even if placed under high temperature conditions of over 600° C. for a long time in a reducing atmosphere.

In the present embodiment, the reduction-resistant coating 1b is preferably lower in conductivity than the thermistor body 1a and is more preferably electrically insulative so that the resistance of the thermistor element 2 is in general determined depending on the resistance of the thermistor body 1a.

It is particularly desirable that both of the A-site of the perovskite phase and the complex oxide contain at least either Sr or Y and, at the same time, both of the B-site of the perovskite phase and the complex oxide contain Al. The complex oxide of at least either Sr or Y and Al is stable under high temperature conditions and shows excellent reduction resistance. Further, Sr, Y and Al are suitable as the A-site element and B-site element of the perovskite phase, respectively, as mentioned above. In addition, the compositions of the thermistor body 1a and of the reduction-resistant coating 1b are unlikely to vary due to metal migration between the perovskite phase and the reduction-resistant coating 1b when the metal elements of the complex oxide are the same as the A-site and B-site elements of the perovskite phase. The thermistor element 2 becomes thus able to attain more stable characteristics upon selection of at least either Sr or Y as the A-site element of the perovskite phase and the constituent element of the complex oxide and Al as the B-site element of the perovskite phase and the constituent element of the complex oxide.

It is more desirable that the A-site of the perovskite phase contains Sr, the B-site of the perovskite phase contains Al and the complex oxide is $SrAl_2O_4$. The complex oxide $SrAl_2O_4$ is stable under high temperature conditions and shows excellent reduction resistance, and Sr and Al are suitable as the A-site element and B-site element of the perovskite phase, respectively. The thermistor element 2 becomes thus able to attain stable characteristics assuredly upon selection of Sr as the A-site element of the perovskite phase and the constituent element of the complex oxide and Al as the B-site element of the perovskite phase and the constituent element of the complex oxide.

Preferably, the thermistor body 1a contains at least one metal oxide phase lower in conductivity than the perovskite phase and represented by the composition formula: $MeO_x$ where Me is at least one selected from the metal elements of the perovskite phase. Even when the thermistor element 2 is of any desired shape, it becomes thus possible to adjust the resistance of the thermistor body 1a, and by extension, the resistance of the thermistor element 2 appropriately while maintaining a suitable B-value by changing the proportion of the low-conductivity (highly-insulating) metal oxide phase in the thermistor body 1a.

If the metal element Me is different from the metal element of the perovskite phase, there arises a possibility that the characteristics of the thermistor body 1a change with the formation of an unexpected by-product (by-product phase) other than the perovskite phase and the metal oxide phase in the thermistor body 1a. There also arises a possibility that the characteristics of the thermistor body 1a change with variations in compositions due to metal migration between the perovskite phase and the metal oxide phase. In the present embodiment, however, the metal element Me is the same as the metal element of the perovskite phase so that the thermistor element 2 becomes able to attain stable resistance characteristics, with no unexpected by-product formation and with no or little variations in compositions, even if subjected to high temperatures for a long time.

There is no particular restriction on the metal oxide phase as long as the metal oxide phase is a phase of a metal oxide having a crystal structure represented by the composition formula: $MeO_x$ where Me is at least one selected from the metal elements of the perovskite phase. Specific examples of such a metal oxide are single-metal oxides e.g. $Y_2O_3$, SrO, CaO, $MnO_2$, $Al_2O_3$ and $Cr_2O_3$ and complex oxides such as Y—Al oxides e.g. $YAlO_3$ and $Y_3Al_5O_{12}$ and Sr—Al oxides e.g. $SrAl_2O_4$ when the perovskite phase has a composition of $(Y, Sr)(Mn, Cr, Al)O_3$. A plurality of metal oxide compounds may be contained in combination.

It is more preferable that the metal oxide phase is of the same complex oxide as that of the reduction-resistant coating 1b. In this case, metal migration between the metal oxide phase and the reduction-resistant coating 1b is unlikely to occur even if the thermistor element 2 is subjected to high temperatures for a long time. It becomes thus possible to limit variations in the compositions of the metal oxide phase and the reduction-resistant coating 1b and provide the thermistor element 2 with stable characteristics. Further, there is no difference in thermal expansion coefficient between the metal oxide phase and the reduction-resistant coating 1b so that the metal oxide phase and the reduction-resistant coating 1b can be readily integrated with each other to achieve secure adhesion between the thermistor body 1a and the reduction-resistant coating 1b.

It is further preferable to produce thermistor element 2 by forming a green (unsintered) thermistor material into a desired shape, applying a green (unsintered) coating material to the thermistor material, and then, sintering the thermistor material and the coating material simultaneously to complete the thermistor body 1a and the reduction-resistant coating 1b. The simultaneous sintering of the thermistor material and the coating material allows easier production of the thermistor element 2 with the thermistor body 1a and the reduction-resistant coating 1b as compared to the case of producing the thermistor element 2 by sintering the thermistor material to complete the thermistor body 1a, applying the coating material to the thermistor body 1a and then sintering the coating material to complete the reduction-resistant coating 1b. This also makes it possible to reduce characteristics variations between individual samples of the thermistor element 2 and between different sintering lots of samples of the thermistor element 2 with little influence of fluctuations of the sintering conditions.

The coating material is preferably in the form of a slurry containing therein the complex oxide. The use of the slurry containing therein the complex oxide as the coating material allows easy application of the coating material and makes it possible to limit the influence of sintering of the coating material on the thermistor body 1a (perovskite phase, metal oxide phase) and the reduction-resistant coating 1b as compared to the case of forming the complex oxide during the sintering.

Figure 2:
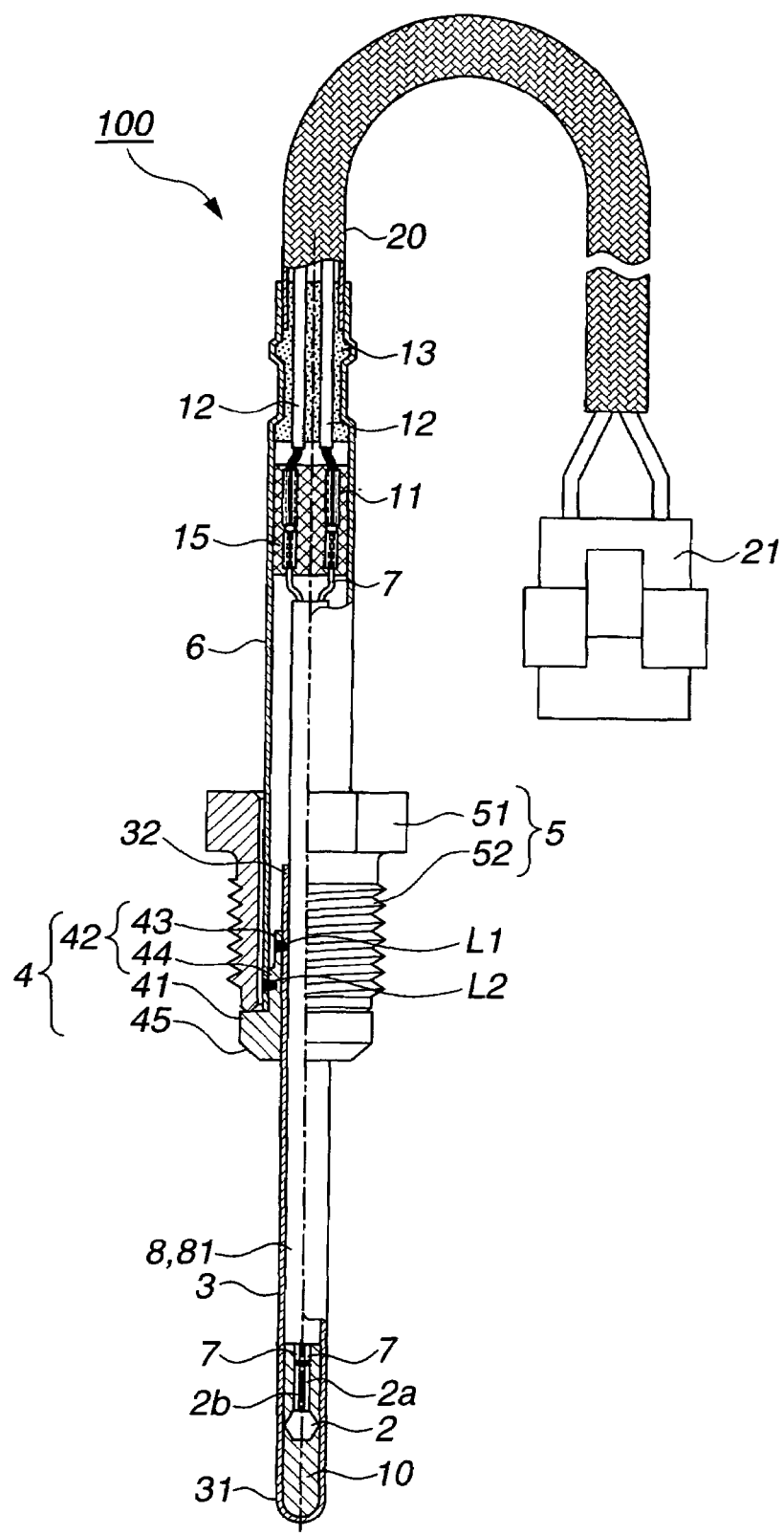
FIG. 2 is a sectional view of a temperature sensor equipped with the thermistor element according to one embodiment of the present invention.

As shown in FIG. 2, the thermistor element 2 is suitably used as a temperature-sensing element of a temperature sensor 100. In the present embodiment, the temperature sensor 100 is designed to detect the temperature of exhaust gas in an exhaust pipe of an automotive engine by being mounted on a sensor mount portion of the exhaust pipe with the thermistor element 2 located in the exhaust pipe.

The temperature sensor 100 includes a metal tube 3, a flange member 4, an attachment member 5, a metal cover member 6, a sheath member 8, a cement material 10, crimp terminals 11, lead wires 12, an elastic seal member 13, insulating tubes 15 and a glass braided tube 20 in addition to the thermistor element 2.

The metal tube 3 is formed into a bottomed cylindrical shape along the axial direction of the sensor 100 and has a closed front end portion 31 (on the bottom side in FIG. 2) in which the thermistor element 2 is installed and a open rear end portion 32 (on the top side in FIG. 2) press-fitted in the flange member 4. The metal tube 3 has previously been heat-treated so that the outer and inner surfaces of the metal tube 3 become oxidized to form an oxide coating film on the outer and inner surfaces of the metal tube 3. The cement material 10 is filled in the metal tube 3 so as to surround the thermistor element 2 and thereby hold the thermistor element 2 in position.

The flange member 4 includes a cylindrical shell 42 extending in the axial direction of the sensor 100 and a flange 41 located on a front side of the shell 42 (on the bottom side in FIG. 2) and having a larger outer diameter than that of the shell 42 to protrude radially outwardly from the shell 42. The flange member 41 also includes a tapered seat surface 45 formed on a front end of the flange 41 to seal the mount portion of the exhaust pipe. In the present embodiment, the shell 42 has a stepped shape with a front shell portion 44 and a rear shell portion 43 smaller in diameter than the front shell portion 44.

The metal tube 3 is held securely in the flange member 4 by press-fitting the rear end portion 32 of the metal tube 3 through the flange member 4 and laser-welding an outer surface of the metal tube 3 to the rear shell portion 43 of the flange member 4 at a location L1 throughout the circumference.

The metal cover member 6 is airtightly joined to the front shell portion 44 of the flange member 4 by press-fitting the metal cover member 6 in the front shell portion 44 of the flange member 4 and laser-welding the metal cover member 6 to the front shell portion 44 of the flange member 4 at a location L2 throughout the circumference.

The attachment member 5 is provided with a hexagonal nut 51 and a screw 52 and is rotatably fixed around the flange member 4 and the metal cover member 6 so that the temperature sensor 100 is attached to the exhaust pipe (not shown) by screwing the nut 5 into the sensor mount portion of the exhaust pipe with the seat surface 45 on the flange 41 of the flange member 4 held in contact with the sensor mount portion of the exhaust pipe.

The sheath member 8 is arranged in the metal tube 3, the flange member 4 and the metal cover member 6. The sheath member 8 includes a metallic outer casing 81, a pair of conductive core wires 7 passed through the outer casing 81, an insulative powder material filled in the outer casing 81 in such a manner as to establish electrical insulation between the outer casing 81 and the core wires 7 and hold the core wires 7 in position. The outer casing 81 of the sheath member 8 has also previously been heat-treated to form an oxide coating film on the outer casing 81 of the sheath member 8. The core wires 7 have front and rear end portions protruded from the front and rear ends of the outer casing 81, respectively. The protruded front end portions of the core wires 7 are connected within the metal tube 3 to the electrode wires 2a and 2b of the thermistor element 2 by laser welding, whereas the protruded rear end portions of the core wires 7 are connected to the lead wires 12 via the crimp terminals 11. The insulating tubes 15 are arranged to provide electrical insulation between the core wires 7 and between the crimp terminals 11.

The lead wires 12 pass through lead wire insertion holes of the seal member 13, which is fitted in the rear end portion of the metal cover member 6, extend from inside to outside of the metal cover member 6, and then, are coupled to terminals of a connector 21 for connection to an external circuit (such as ECU, not shown). With this arrangement, the output of the thermistor element 2 is sent from the core wires 7 of the sheath member 8 to the external circuit through the lead wires 12 and the connector 21 so as to determine the temperature of the exhaust gas in the automotive engine. In order to protect the lead wires 12 from external force e.g. scattering stones, the lead wires 12 are covered by the glass braided tube 20. The glass braided tube 20 is crimped at a front end thereof into the metal cover member 6 together with the elastic seal member 13.

In the above-structured temperature sensor 100, the thermistor body 1 is protected from thermal reduction by means of the reduction-resistant coating 1a, for example, when there occurs a break or defect in the oxide coating film of the metal tube 3 or the outer casing 81 of the sheath member 8 or even when the thermistor element 2 is subjected to a reducing atmosphere under high temperature conditions due to such a break or defect in the oxide coating film. The thermistor element 2 is therefore able to maintain its resistance value and characteristics stably so that the temperature sensor 100 can carry out proper temperature measurements over the wide temperature range of −40° C. to 900° C.

The present invention will be described in more detail with reference to the following examples. It should be however noted that the following examples are only illustrative and not intended to limit the invention thereto.

Sample Preparation

Thermistor element 2 according to Examples 1 to 4 and thermistor elements according to Comparative Examples 1 to 3 were produced as follows.

In each of Examples 1 to 4 and Comparative Examples 1 and 2, powders of $Y_2O_3$, $Nd_2O_3$, $SrCO_3$, $MnO_2$, $Fe_2O_3$, $Al_2O_3$ and $Cr_2O_3$ (all commercially available at purity of 99% or greater) were weighed to attain a perovskite composition of $(M1_aM2_b)(M3_cAl_dCr_e)O_3$ by metal elements M1, M2 and M3 and mole fractions a, b, c, d and e as indicated in TABLE 1, followed by subjecting these powders to wet mixing and drying. The resultant powder mixture was calcined at 1400° C. for 2 hours in the air to provide a calcined powder material for perovskite phase formation with an average grain size of 1 to 2 μm. On the other hand, powders of $SrCO_3$ and $Al_2O_3$ (both commercially available at purity of 99% or greater) were weighed to attain a composition of $SrAl_2O_4$, followed by subjecting these powders to wet mixing and drying. The resultant powder mixture was calcined at 1200° C. for 2 hours in the air to provide a calcined powder material for metal oxide phase formation with an average grain size of 1 to 2 μm.

The calcined perovskite-phase forming material and the calcined metal-oxide-phase forming material were weighed and subjected to wet grinding with a resin pot and a high-purity $Al_2O_3$ ball using ethanol as a solvent, thereby yielding a slurry of thermistor composition material.

In Comparative Example 3, powders of $Y_2O_3$ and $Cr_2O_3$ (both commercially available at purity of 99% or greater) were weighed to attain a mole ratio of Y:Cr=1:1, i.e., to attain a composition of $YCrO_3$, followed by subjecting these powders to wet mixing and drying. The resultant powder mixture was calcined at 1200° C. for 2 hours in the air to provide a calcined powder material for perovskite phase formation with an average grain size of 1 to 2 μm. The calcined perovskite-phase forming material was subjected to wet grinding with a resin pot and a high-purity $Al_2O_3$ ball using ethanol as a solvent, thereby yielding a slurry of thermistor composition material.

The thus-obtained slurry was dried at 80° C. for 2 hours to provide a powdery thermistor composition material.

Subsequently, 100 parts by weight the thermistor composition material and 20 parts by weight a binder predominantly composed of polyvinyl butyral were mixed, dried and granulated with a 250-μm mesh screen. It is herein noted that the binder is not particularly restricted to the polyvinyl butyral. Any other binder such as polyvinyl alcohol or acrylic binder can alternatively be used. The blending amount of the binder is generally 5 to 20 parts by weight, preferably 10 to 20 parts by weight, with respect to the total amount of the thermistor composition material. It is further desirable to control the average grain size of the thermistor composition material to 2.0 μm or smaller in order for the thermistor composition material and the binder to be mixed uniformly.

The granulated thermistor composition material was subjected to die-press forming with a press pressure of 4500 kg/cm², thereby forming a green compact of hexagonal plate shape with a thickness of 1.24 mm in thickness. In Examples 1 to 4, electrode wires 2a and 2b of Pt—Rh alloy were embedded at their respective one ends in the green compact. Similarly, electrode wires of Pt—Rh alloy were embedded at their respective one ends in the green compact in Comparative Examples 1 to 3.

Next, powders of $SrCO_3$, $Al_2O_3$ and $Y_2O_3$ (all commercially available at purity of 99% or greater) were weighed to attain a complex oxide composition as indicated in TABLE 1 ($SrAl_2O_4$ in Examples 1, 3 and 4, $Y_3Al_5O_{12}$ in Example 2 and Comparative Example 3, $Y_2O_3$ in Comparative Example 1 and $Al_2O_3$ in Comparative Example 2), followed by subjecting these powders to wet mixing and drying. The resultant powder mixture was calcined at 1200 to 1400° C. for 2 hours in the air to provide a powdery complex-oxide coating material with an average grain size of 1 to 2 μm. A slurry of the complex-oxide coating material was obtained by kneading the powdery complex-oxide material with a binder predominantly composed of ethyl cellulose with a mortar and a pestle using butyl carbinol and acetone as a solvent.

In each of Examples 1, 3 and 4, the green compact of the thermistor composition material except the electrode wires 2a and 2b was dip-coated with the slurry of the complex-oxide material. The thermistor element 2 was completed by, after drying the slurry, sintering the slurry-coated compact (sintering the thermistor composition material and the complex-oxide material simultaneously) at 1450 to 1550° C. in the air so as to form a thermistor body 1a of the thermistor composition material and a reduction-resistant coating 1b of the complex-oxide material. The thermistor body 1a had a hexagonal shape with a side length of 1.15 mm and a thickness of 1.00 mm, the reduction-resistant coating 1b had a thickness of 10 to 50 μm, and the electrode wires 2a and 2b had a diameter ϕ of 0.3 mm with a electrode center distance of 0.74 mm (a gap of 0.44 mm) and an electrode insertion length of 1.10 mm.

In Example 2, the green compact of the thermistor composition material was first sintered at 1450 to 1550° C. in the air so as to form a thermistor body 1a of the thermistor composition material. The sintered compact except the electrode wires 2a and 2b was next dip-coated with the slurry of the complex-oxide material. The thermistor element 2 was then completed by, after drying the slurry, sintering the slurry-coated compact again so as to form a reduction-resistant coating 1b of the complex-oxide material. The thermistor body 1a had a hexagonal shape with a side length of 1.15 mm and a thickness of 1.00 mm, the reduction-resistant coating 1b had a thickness of 10 to 50 μm, and the electrode wires 2a and 2b had a diameter ϕ of 0.3 mm with a electrode center distance of 0.74 mm (a gap of 0.44 mm) and an electrode insertion length of 1.10 mm.

In Comparative Examples 1 and 2, the thermistor elements were completed in the same manner as in Examples 1, 3 and 4. The thermistor element was completed in Comparative Example 3 in the same manner as in Example 2.

It is noted that the complex-oxide coating materials of Example 2 and of Comparative Example 3 were $Y_3Al_5O_{12}$, which has a higher sintering temperature than those of the thermistor composition materials of Example 2 and of Comparative Example 3. In Example 2 and Comparative Example 3, the thermistor body 1a and the reduction-resistant coating 1b were thus formed step by step by sintering the thermistor composition material and then sintering the complex-oxide coating material as explained above. This led to easier and lower-cost production of the thermistor element 2 in Examples 1, 3 and 4 than in Example 2.

Performance Evaluation

The thermistor elements 2 of Examples 1 to 4 and the thermistor elements of Comparative Examples 1 to 3 were tested for their reduction resistance as follows.

Each of the thermistor elements 2 according to Examples 1 to 4 was placed in a tubular furnace and isolated from the air. At this stage, the interior of the furnace was under the air atmosphere. The furnace was heated so that the interior temperature of the furnace reached 1000° C., to measure the resistance value Rk(1000) of the thermistor element 2 at 1000° C. under the air atmosphere. Next, a reducing atmosphere was created in the interior of the furnace by feeding hydrogen gas and water vapor gas into the furnace through gas pipes to control the partial pressure of oxygen in the interior of the furnace to $PO_2=10^{-11.1}$ (atm) while maintaining the interior temperature of the furnace at 1000° C. The thermistor element 2 was left for 1 hour in the reducing atmosphere, to measure the resistance value Rk'(1000) of the thermistor element 2 at 1000° C. under the reducing atmosphere. The amount ΔRk (%) of change in resistance was calculated from the measurement values Rk(1000) and Rk'(1000), according to the following equation (1), as an index of the resistance of the coating 1b to thermal reduction as well as the ability of the coating 1b to protect the thermistor body 1a from the reducing atmosphere.

$$\Delta Rk(\%)=100-(Rk(1000)/Rk'(1000))\times 100 \quad (1)$$

The resistance change amount ΔRk (%) of the thermistor element according to each of Comparative Examples 1 to 3 was determined in the same manner as in Examples 1 to 4.

The thermistor elements 2 of Examples 1 to 4 and the thermistor elements of Comparative Examples 1 to 3 had a small resistance change amount ΔRk of at most ±5%. It is thus apparent that all of the reduction-resistant coatings 1b of Examples 1 to 4 and the reduction-resistant coatings of Comparative Examples 1 to 3 had high reduction resistance and thermistor protection ability.

The thermistor elements 2 of Examples 1 to 4 and the thermistor elements of Comparative Examples 1 to 3 were also tested for their resistance characteristics as follows.

The temperature gradient constant (B-value) B(−40~900) of the thermistor element 2 according to each of Examples 1 to 3 was determined. More specifically, the initial resistance value Rs(−40) of the thermistor element 2 was measured under the condition that the thermistor element 2 was left in an atmosphere of absolute temperature T(−40)=233 K (=−40° C.). After that, the initial resistance value Rs(900) of the thermistor element 2 was measured under the condition that the thermistor element 2 was left in an atmosphere of absolute temperature T(900)=1173 K (=900° C.). The B-value B(−40~900) of the thermistor element 2 was calculated from the measurement values Rs(−40) and Rs(900) according to the following equation (2). The test results are indicated in TABLE 2.

$$B(-40\sim 900)=\ln[Rs(900)/Rs(-40)]/[1/T(900)-1/T(-40)] \quad (2)$$

The temperature gradient constant (B-value) B(100~900) of the thermistor element 2 according to Example 4 was determined in the same way as above. Namely, the initial resistance value Rs(100) of the thermistor element 2 was first measured under the condition that the thermistor element 2 was left in an atmosphere of absolute temperature T(100) =373 K (=100° C.). After that, the initial resistance value Rs(900) of the thermistor element 2 was measured under the condition that the thermistor element 2 was left in an atmosphere of absolute temperature T(900)=1173 K (=900° C.). The B-value B(100~900) of the thermistor element 2 was then calculated from the measurement values Rs(100) and Rs(900) according to the following equation (3). The test results are indicated in TABLE 2.

$$B(100\sim 900)=\ln[Rs(900)/Rs(100)]/[1/T(900)-1/T(100)] \quad (3)$$

The temperature gradient constant (B-value) B(−40~900) of the thermistor element according to each of Comparative Examples 1 to 3 was determined in the same manner as in Examples 1 to 3. The test results are also indicated in TABLE 2.

Each of the thermistor elements 2 of Examples 1 to 4 was built into a temperature sensor 100. The surroundings of the temperature sensor 100 was heated to 100° C., 300° C., 600° C. and then 900° C., to measure the initial resistance values Rt(100), Rt(300), Rt(600) and Rt(900) of the thermistor element 2 at 100° C., 300° C., 600° C. and 900° C. The temperature sensor 100 was maintained at 1050° C. in the air for 50 hours. After that, the resistance values Rt'(100), Rt'(300), Rt'(600) and Rt'(900) of the thermistor element 2 were measured at 100° C., 300° C., 600° C. and 900° C. in the same manner as above. Upon comparison between the initial resistance value Rt(900) and the post heat treatment resistance value Rt'(900), the temperature conversion value CT(900) (deg) of the resistance change under the heat treatment was calculated according to the following equation (4). Similarly, the temperature conversion values CT(100), CT(300) and CT(600) (deg) were calculated according to the following equations (5) to (7). In Example 4, the B-value B(100~900) was used in place of B(−40~900) in the equations (4) to (7) for calculation of the conversion values CT(900), CT(100), CT(300) and CT(600) (deg). The test results are indicated in TABLE 2.

$$CT(900)=[(B(-40\sim 900)\times T(900))/[\ln(Rt'(900)/Rt(900))\times T(900)+B(-40\sim 900)]]-T(900) \quad (4)$$

$$CT(100)=[(B(-40\sim 900)\times T(100))/[\ln(Rt'(100)/Rt(100))\times T(100)+B(-40\sim 900)]]-T(100) \quad (5)$$

$$CT(300)=[(B(-40\sim900)\times T(300))/[\ln(Rt'(300)/Rt(300))\times T(300)+B(-40\sim900)]]-T(300) \quad (6)$$

$$CT(600)=[(B(-40\sim900)\times T(600))/[\ln(Rt'(600)/Rt(600))\times T(600)+B(-40\sim900)]]-T(600) \quad (7)$$

The temperature conversion values CT(900), CT(100), CT(300) and CT(600) (deg) of the thermistor element according to each of Comparative Examples 1 to 3 was determined in the same manner as above. The test results are also indicated in TABLE 2.

Further, the surface area fraction SP/S of a perovskite phase of the thermistor body 1a according to each of Examples 1 to 4 was determined as follows.

Figure 3:
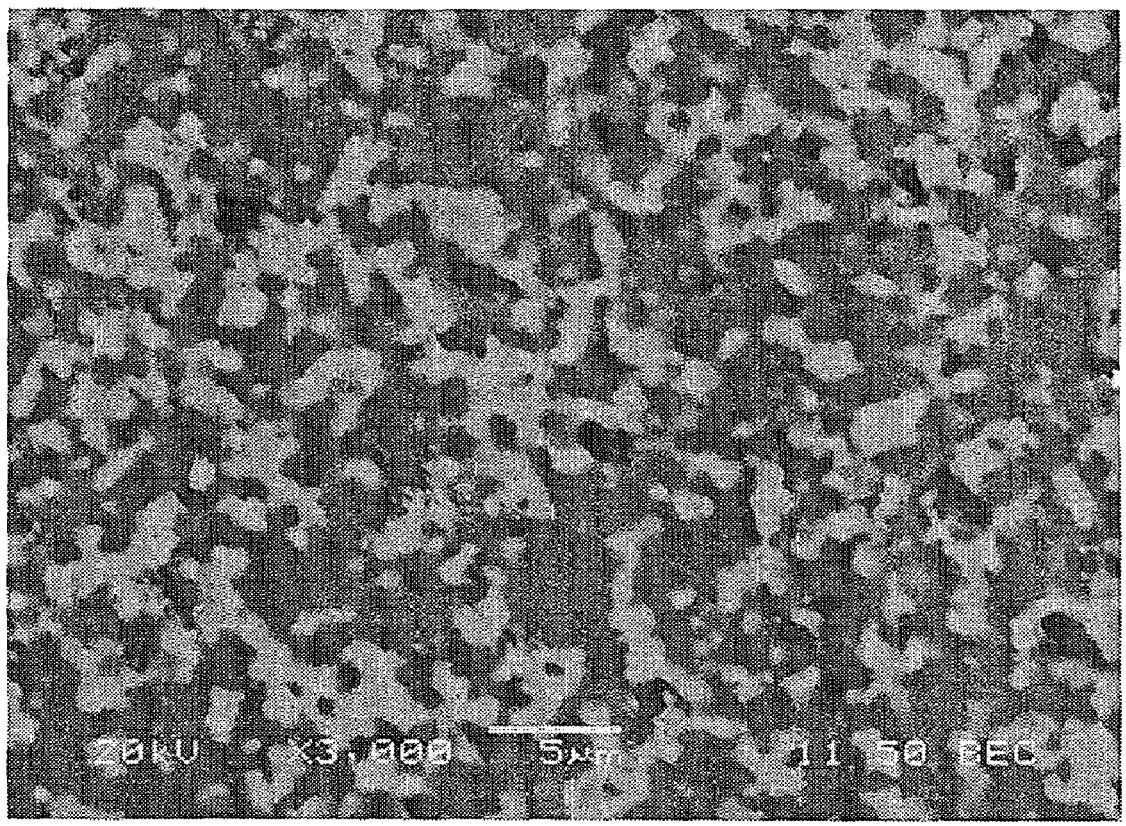
FIG. 3 is a scanning electron microscopic (SEM) picture showing one example of material structure of the thermistor element according to one embodiment of the present invention.

The thermistor body part 1 was embedded in a resin and subjected to buffing using 3-μm diamond past to provide a test sample of thermistor body 1a with a buffed cross section. A picture of the cross section of the test sample was taken with a magnification of 3000 times using a scanning electron microscope (available under the trade name of "JSM-6460LA" from JEOL Ltd.). By way of example, the SEM picture of the thermistor body 1a according to Example 1 is indicated in FIG. 3. Herein, white, dark gray and black areas of the SEM picture were determined by EDS chemical composition analysis to be a perovskite phase ((YSr)(MnCrAl)O$_3$), a metal oxide phase (SrAl$_2$O$_4$) and pores, respectively. It has been shown in FIG. 3 that the perovskite phase and the metal oxide phase are dispersed through the thermistor body 1a in Example 1. The same applied to Examples 2 to 4. A field of view of 40 μm×30 μm in the SEM picture was analyzed by means of an image analysis device, thereby determining the proportion (surface area fraction) SP/S of the cross sectional area SP of the perovskite phase to the field of view (cross sectional area S). The test results are indicated in TABLE 2. When a thermistor body is provided with multiple phases, the proportion of a cross sectional area of one specific phase in a given cross sectional area of the thermistor body is equivalent to the volume fraction of such one specific phase in the thermistor oxide. In Examples 1 to 4, the thermistor body 1a had two phases: perovskite phase and metal oxide phase. It means that the surface area fraction SP/S is substantially equal to a surface or volume ratio between the perovskite phase and the metal oxide phase.

The surface area fraction SP/S of a perovskite phase of the thermistor body according to each of Comparative Examples 1 to 3 was determined in the same manner as above. The test results are indicated in TABLE 2.

Moreover, the thermistor elements 2 of Examples 1 to 4 had relatively small conversion values CT(100), CT(300), CT(600) and CT(900) of at most ±3 deg as compared to those of Comparative Examples 1 to 3 as shown in TABLE 2. The reason for this is estimated as follows.

In Comparative Examples 1 and 2, the reduction-resistant coating did not contain a complex oxide but contained a single-metal oxide Y$_2$O$_3$ or Al$_2$O$_3$ so that there occurred migration of the metal element Sr, Mn, Cr, Al from the perovskite phase to the reduction-resistant coating and migration of the metal element Y, Al from the reduction-resistant coating to the perovskite phase. In Comparative Example 3, the reduction-resistant coating contained a complex oxide Y$_3$Al$_5$O$_{12}$ but the metal element Al of the complex oxide was different from the B-site element Cr of the perovskite phase so that the there occurred migration of the metal element Cr from the perovskite phase to the reduction-resistant coating and migration of the metal element Al from the reduction-resistant coating to the perovskite phase. The resistance characteristics of the thermistor body changed due to variations in the compositions of the perovskite phase and the reduction-resistant coating, thereby resulting in the above relatively large conversion values CT(100), CT(300), CT(600) and CT(900) in Comparative Examples 1 to 3.

In Examples 1 to 4, by contrast, the metal elements Sr or Y and Al of the complex oxide of the reduction-resistant coating 1b were the same as the A-site element Sr, Y and the B-site element Al of the perovskite phase of the thermistor body 1a. Variations in the compositions of the perovskite phase and the reduction-resistant coating 1b was limited from being caused due to metal migration between the perovskite phase and the reduction-resistant coating 1b even if the thermistor element 2 was subjected to high temperatures for a long time. As a result, each of the thermistor elements 2 of Examples 1 to 4 had a stable resistance value at each measurement temperature and showed a small amount of change in resistance under high temperature conditions. The resistance values of these thermistor elements 2 could be measured stably, regardless of their thermal histories, for proper temperature measurements.

Further, the thermistor elements 2 of Examples 1, 3 and 4 generally had smaller conversion values CT(100), CT(300), CT(600) and CT(900) than those of Example 2. It can be thus said that SrAl$_2$O$_4$ was more suitable as the complex oxide of the reduction-resistant coating 1b. In Examples 1 and 3, the metal oxide phase of the thermistor body 1a and the reduction-resistant coating 1b were of the same complex oxide so that the reduction-resistant coating 1b was securely adhered to the thermistor body 1a to provide high durability because of no difference in thermal expansion coefficient between the metal oxide phase and the reduction-resistant coating 1b (the complex oxide).

In Examples 1 to 3 where both of the perovskite phase and the metal oxide phase were contained in the thermistor body 1a, it was possible to control the resistance value of the thermistor element 2 appropriately by adjusting the proportion of the metal oxide phase in the thermistor body 1a i.e. the surface area fraction SP/S of the perovskite phase of thermistor body 1a according to the shape (such as an electrode wire gap) of the thermistor element 2 while maintaining the B-value B B(−40~900) suitably at 2000 to 3000 K.

TABLE 1

| | | | | Thermistor body | | | | | | |
|---|---|---|---|---|---|---|---|---|---|---|
| | | | Perovskite phase (M1$_a$M2$_b$)(M3$_c$Al$_d$Cr$_e$)O$_3$ | | | | | | Metal oxide phase | |
| | a | b | c | d | e | M1 | M2 | M3 | Composition | MeO$_x$ | Coating |
| Example 1 | 0.90 | 0.10 | 0.3325 | 0.6500 | 0.0175 | Y | Sr | Mn | (YSr)(MnCrAl)O$_3$ | SrAl$_2$O$_4$ | SrAl$_2$O$_4$ |
| Example 2 | 0.90 | 0.10 | 0.3325 | 0.6500 | 0.0175 | Y | Sr | Mn | (YSr)(MnCrAl)O$_3$ | SrAl$_2$O$_4$ | Y$_3$Al$_5$O$_{12}$ |
| Example 3 | 0.90 | 0.10 | 0.3600 | 0.6000 | 0.0400 | Nd | Sr | Mn | (NdSr)(MnCrAl)O$_3$ | SrAl$_2$O$_4$ | SrAl$_2$O$_4$ |
| Example 4 | 0.84 | 0.16 | 0.3000 | 0.7000 | — | Y | Sr | Fe 0.45 Mn 0.55 | (YSr)(FeMnAl)O$_3$ | — | SrAl$_2$O$_4$ |
| Comparative Example 1 | 0.90 | 0.10 | 0.3325 | 0.6500 | 0.0175 | Y | Sr | Mn | (YSr)(MnCrAl)O$_3$ | SrAl$_2$O$_4$ | Y$_2$O$_3$ |

TABLE 1-continued

| | Thermistor body | | | | | | | | | Metal oxide phase | |
| --- | --- | --- | --- | --- | --- | --- | --- | --- | --- | --- | --- |
| | Perovskite phase $(M1_aM2_b)(M3_cAl_dCr_e)O_3$ | | | | | | | | | | |
| | a | b | c | d | e | M1 | M2 | M3 | Composition | $MeO_x$ | Coating |
| Comparative Example 2 | 0.90 | 0.10 | 0.3325 | 0.6500 | 0.0175 | Y | Sr | Mn | $(YSr)(MnCrAl)O_3$ | $SrAl_2O_4$ | $Al_2O_3$ |
| Comparative Example 3 | 1 | 0 | 0 | 0 | 1 | Y | — | — | $YCrO_3$ | — | $Y_3Al_5O_{12}$ |

TABLE 2

| | Surface area fraction | Initial resistance | | B-value | Conversion value | | | |
| --- | --- | --- | --- | --- | --- | --- | --- | --- |
| | SP/S (%) | Rs(−40) (kΩ) | Rs(900) (kΩ) | B(−40~900) (K) | CT(100) (deg) | CT(300) (deg) | CT(600) (deg) | CT(900) (deg) |
| Example 1 | 32 | 189 | 0.058 | 2349 | −1.1 | 0.1 | 2.3 | −1.1 |
| Example 2 | 32 | 242 | 0.061 | 2409 | 1.1 | 1.4 | 2.4 | 1.9 |
| Example 3 | 27 | 800 | 0.052 | 2803 | −0.5 | −1.5 | −2.0 | −2.0 |
| Example 4 | 100 | *¹356 | 0.087 | *²4565 | 0.2 | 0.7 | 1.2 | 0.4 |
| Comparative Example 1 | 32 | 306 | 0.063 | 2468 | 8.5 | 8.5 | 7.5 | 8.0 |
| Comparative Example 2 | 32 | 157 | 0.040 | 2406 | 1.2 | 3.3 | 6.3 | 7.3 |
| Comparative Example 3 | 100 | 7 | 0.150 | 1126 | −45 | −52 | −50 | −60 |

Remarks:
*¹The initial resistance Rs(100) at 100° C.
*²The B-value B(100~900) at 100 to 900° C.

As described above, the thermistor element 2 of the present embodiment shows a suitable B-value of 2000 to 3000 K as well as a suitable resistance value so as to enable proper temperature measurements over the wide temperature range of a low temperature of −40° C. to a high temperature of 900° C.

The entire contents of Japanese Patent Application No. 2006-039680 (filed on Feb. 16, 2006) are herein incorporated by reference.

Although the present invention has been described with reference to the above-specific embodiments of the invention, the invention is not limited to the these exemplary embodiments. Various modification and variation of the embodiments described above will occur to those skilled in the art in light of the above teaching.

For example, various compounds including not only oxides but also carbonates, hydroxides and nitrates of the respective constituent elements of the thermistor body 1a and the reduction-resistant coating 1b are usable as raw materials for production of the thermistor element 2. In particular, oxide and carbonate are preferred.

The thermistor body 1a and the reduction-resistant coating 1b may contain any other element or elements such as Na, K, Ga, Si, C, Cl and S on condition that the characteristics required of the thermistor body 1a, the reduction-resistant coating 1b, the thermistor element 2 and the temperature sensor 100 (such as the sinterability, B-value, high-temperature stability and reduction resistance of the thermistor body 1a and the reduction-resistant coating 1b) do not deteriorate.

The oxide coating films may not be formed on the metal tube 3 and the outer casing 81 of the sheath member 8 when the reduction-resistance coating 1b provides sufficient, favorable reduction resistance.

The scope of the invention is defined with reference to the following claims.

What is claimed is:

1. A thermistor element comprising:
   a thermistor body containing a perovskite phase of perovskite-type crystal structure represented by the composition formula: $ABO_3$ where A is at least one A-site element including Sr and B is at least one B-site element including Al; and
   a reduction-resistant coating covering the thermistor body and formed of a complex oxide containing Sr and Al.

2. A thermistor element according to claim 1, wherein the complex oxide is $SrAl_2O_4$.

3. A temperature sensor comprising the thermistor element according to claim 1.

4. A temperature sensor according to claim 3, further comprising a metal tube accommodating therein the thermistor element, wherein the metal tube has previously been heat-treated to form a coating film of oxide on the metal tube.

5. A method for producing the thermistor element according to claim 1, comprising:
   forming a green thermistor composition material into a desired shape;
   applying a green coating material to a surface of the green thermistor composition material; and then
   sintering the thermistor composition material and the coating material simultaneously in such a manner that the thermistor body and the reduction-resistant coating are produced from the sintered thermistor composition material and the sintered coating material, respectively.

6. A method according to claim 5, wherein the coating material is a slurry containing therein the complex oxide.

7. A thermistor element comprising:
a thermistor body containing a perovskite phase and a metal oxide phase, the perovskite phase having a perovskite-type crystal structure represented by the composition formula: $ABO_3$ where A is at least one A-site element and B is at least one B-site element, the metal oxide phase having a lower electrical conductivity than that of the perovskite phase; and
a reduction-resistant coating covering the thermistor body, the metal oxide phase and the reduction-resistance coating being of the same complex oxide containing one or more of the at least one A-site and one or more of the at least one B-site element.

8. A thermistor element according to claim 7, wherein said one or more of the at least one A-site element includes Sr and said one or more of the at least one B-site element includes Al.

9. A thermistor element according to claim 8, wherein the complex oxide is $SrAl_2O_4$.

10. A temperature sensor comprising the thermistor element according to claim 7.

11. A temperature sensor according to claim 10, further comprising a metal tube accommodating therein the thermistor element, wherein the metal tube has previously been heat-treated to form a coating film of oxide on the metal tube.

12. A method for producing the thermistor element according to claim 7, comprising:
forming a green thermistor composition material into a desired shape;
applying a green coating material to a surface of the green thermistor composition material; and then
sintering the thermistor composition material and the coating material simultaneously in such a manner that the thermistor body and the reduction-resistant coating are produced from the sintered thermistor composition material and the sintered coating material, respectively.

13. A method according to claim 12, wherein the coating material is a slurry containing therein the complex oxide.

* * * * *